United States Patent
Han et al.

(10) Patent No.: US 7,582,993 B2
(45) Date of Patent: Sep. 1, 2009

(54) MOTOR HAVING REVERSE ROTATION PREVENTING UNIT

(75) Inventors: Seung-Do Han, Incheon (KR);
Seung-Suk Oh, Gwangmyeong (KR);
Jae-Hong Ahn, Anyang (KR);
Hyoun-Jeong Shin, Incheon (KR);
Dong-Il Lee, Bucheon (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 11/423,724

(22) Filed: Jun. 13, 2006

(65) Prior Publication Data
US 2006/0284500 A1    Dec. 21, 2006

(30) Foreign Application Priority Data
Jun. 16, 2005    (KR) ................ 10-2005-0052058

(51) Int. Cl.
*H02K 7/10*    (2006.01)
(52) U.S. Cl. .................... 310/41; 310/68 E
(58) Field of Classification Search .......... 310/41, 310/162, 83, 75 R, 77, 78, 68 E, 254, 49 R, 310/37
See application file for complete search history.

(56) References Cited

U.S. PATENT DOCUMENTS

| | | | | |
|---|---|---|---|---|
| 2,689,312 A | * | 9/1954 | Boerger | 310/41 |
| 2,864,017 A | * | 12/1958 | Waltscheff | 310/126 |
| 3,097,278 A | * | 7/1963 | Alderman | 335/125 |
| 3,748,508 A | * | 7/1973 | Woolley | 310/41 |
| 3,842,296 A | * | 10/1974 | Gerber | 310/41 |
| 4,296,341 A | * | 10/1981 | Guttinger | 310/41 |
| 4,386,307 A | * | 5/1983 | Webby | 318/705 |
| 4,406,953 A | * | 9/1983 | Tanaka et al. | 307/141 |
| 4,626,718 A | * | 12/1986 | Moriyama | 310/37 |

(Continued)

FOREIGN PATENT DOCUMENTS

| | | |
|---|---|---|
| JP | 6-025624 | 4/1994 |
| JP | 8-011037 | 3/1996 |
| JP | 9-163663 | 6/1997 |
| KR | 10-1998-0003324 | 3/1998 |

(Continued)

OTHER PUBLICATIONS

English Language Abstract of JP 9-163663.

*Primary Examiner*—Michael C Zarroli
(74) *Attorney, Agent, or Firm*—Ked & Associates, LLP (57) ABSTRACT

A motor having a reverse-rotation preventing unit, comprises: a casing; a stator fixedly-coupled to an inside of the casing; a primary rotor rotatably inserted into the stator; a motor shaft coupled to the primary rotor; a secondary rotor having a permanent magnet and rotatably inserted into an air gap between the stator and the primary rotor; a locking unit installed at an inner wall of the casing; a ratchet unit rotatably coupled to the secondary rotor, and locked or unlocked to/from the locking unit when the secondary rotor is forward-rotated or reverse-rotated, for rotating the secondary rotor in a forward direction; and a position setting unit for moving the ratchet unit to a locking position or a unlocking position by a difference between a centrifugal force generated when the secondary rotor is rotated and its restoration force. In the present invention, the motor is only forward-rotated without being reverse-rotated and thus a reliability thereof is enhanced.

13 Claims, 10 Drawing Sheets

U.S. PATENT DOCUMENTS

| | | |
|---|---|---|
| 4,893,038 A | 1/1990 | Miyzawa |
| 5,027,022 A | 6/1991 | Tanaka et al. |
| 5,117,137 A * | 5/1992 | Kobayashi ................ 310/49 R |
| 5,503,541 A * | 4/1996 | Barito et al. .................. 418/69 |
| 6,960,852 B2 * | 11/2005 | Schwarzli ................. 310/75 R |
| 2006/0175924 A1 | 8/2006 | Han et al. |

* cited by examiner

MOTOR HAVING REVERSE ROTATION PREVENTING UNIT

BACKGROUND OF THE INVENTION

1. Field of the Invention

The present invention relates to a motor, and more particularly, to a motor having a reverse-rotation preventing unit capable of preventing a reverse rotation of a rotor at the time of an initial driving, simplifying a structure, and being easily fabricated.

2. Description of the Background Art

Generally, a motor for converting electric energy into kinetic energy is applied to various fields such as home appliances, etc., and is used as a driving source of the home appliances, etc. For example, when the motor is applied to a refrigerator, the motor rotates a fan thus to circulate cool air inside the refrigerator. When the motor is applied to an air conditioner, the motor rotates a fan thus to flow cool air generated from an evaporator to an indoor room. There are many kinds of motors according to an application field.

As a kind of the motor, an induction motor includes a stator for forming a rotating magnet field, and an induction rotor rotatably inserted into the stator. Recently, an induction motor having a permanent magnet between the stator and the induction rotor for the efficiency enhancement is being developed.

Figure 1:
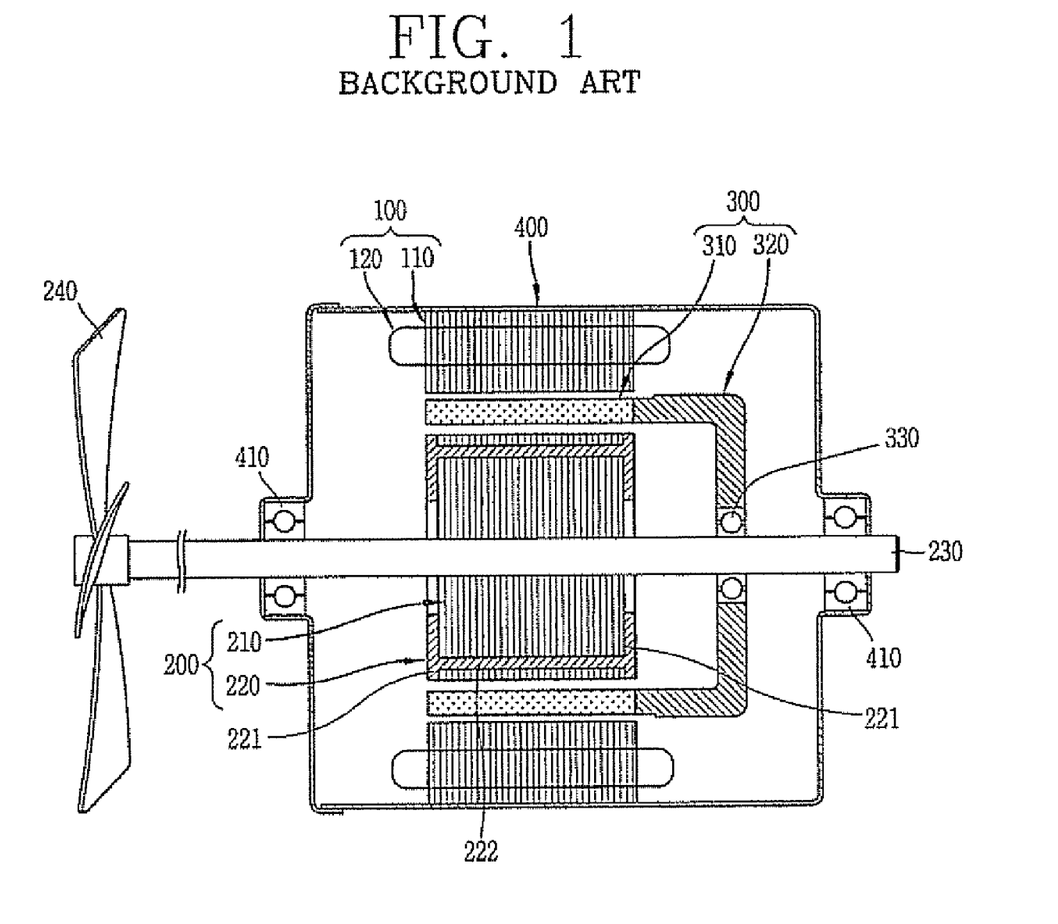
FIGS. 1 and 2 are front and lateral sectional views illustrating an induction motor which is being manufactured by the present applicant who has carried out research and development for the motor.
Figure 2:
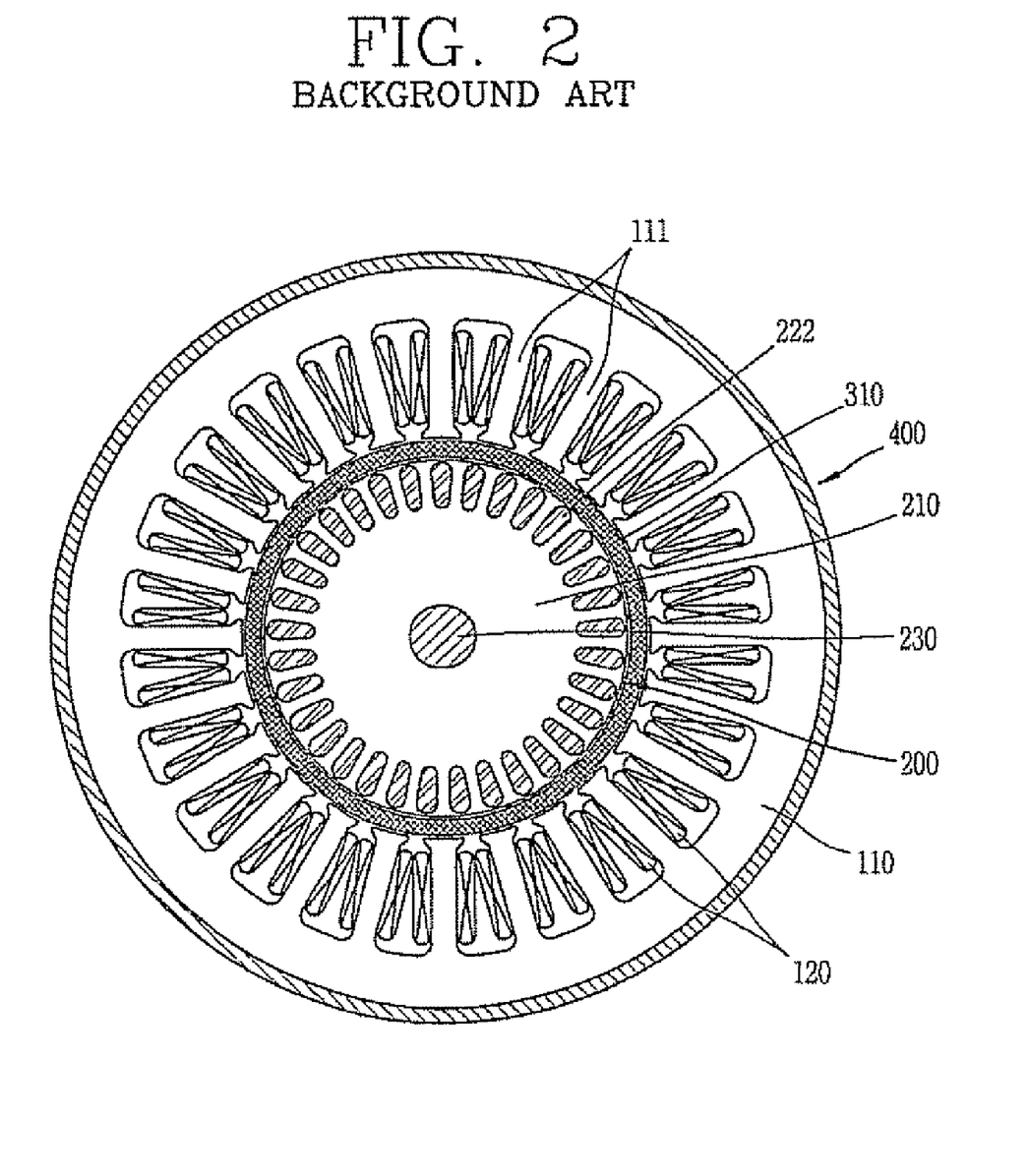

FIG. 1 is a frontal view showing an induction motor in accordance with the conventional art, and FIG. 2 is a sectional view showing an induction rotor of the induction motor.

As shown, the induction motor comprises a stator 100 having winding coils thereon, an induction rotor 200 rotatably inserted into the stator 100, and a synchronous rotor 300 rotatably inserted between the stator 100 and the induction rotor 200.

The stator 100 comprises a stator core 110 having a certain length, and winding coils 120 wound on a plurality of teeth 111 formed in the stator core 110 and generating a rotating magnet field. The stator core 110 is a lamination body formed accordingly as a plurality of sheets are laminated.

The induction rotor 200 comprises a rotor core 210 of a filled cylindrical shape having a certain length and an outer diameter, and a cage 220 inserted into the rotor core 210. A rotation shaft 230 is coupled to a center of the rotor core 210. The rotor core 210 is a lamination body formed accordingly as a plurality of sheets are laminated. The cage 220 includes a ring-shaped end ring 221 positioned at both side surfaces of the rotor core 210, and a plurality of connection rods 222 positioned in the rotor core 210 and connecting the two end rings 221. The cage 220 is a conductor, and is formed at the rotor core 210 by an insert-molding method.

The induction rotor 200 is inserted into an insertion hole of the stator 100.

The synchronous rotor 300 comprises a permanent magnet 310 of a hollow cylindrical type having a certain thickness, and a holder 320 having a cup shape for supporting the permanent magnet 310. The permanent magnet 310 is rotatably inserted into an air gap between the stator 100 and the induction rotor 200. A bearing 330 is coupled to one side of the holder 320, and the bearing 330 is coupled to a rotation shaft 230.

The stator 100 is mounted in a motor casing 400, and bearings 410 are provided at both side surfaces of the motor casing 400. The rotation shaft 230 is coupled to the bearings 410.

In the induction motor, a rotation force is transmitted to a load through the rotation shaft 230, and a fan 240 is mounted at the rotation shaft 230.

An operation of the induction motor will be explained as follows.

When power is supplied to the stator 100 and a rotating magnet field is formed by the applied power, the synchronous rotor 300 having the permanent magnet 310 is relatively rotated centering around the rotation shaft 230. As the synchronous rotor 300 is rotated, an induction current flows to the cage 220 of the induction rotor 200 by a flux of the permanent magnet 310 of the synchronous rotor 300. Herein, the induction rotor 200 is rotated by the rotating magnet field of the stator 100, the permanent magnet 310 of the synchronous rotor 300, the induction current applied to the induction rotor 200, etc.

When the induction motor is initially driven, a rotation speed of the induction rotor 200 reaches up to a synchronous speed by the permanent magnet 310 of the synchronous rotor 300 and a current applied to a sub winding coil of the winding coil 120. Then, the induction rotor 200 is rotated by a current applied to a main winding coil of the winding coil 120.

However, in the induction motor, the synchronous rotor 300 and the induction rotor 200 may be reverse-rotated by an abnormal voltage phase and an uneven rotating magnet field generated when the motor is initially driven. The synchronous rotor 300 and the induction rotor 200 have a larger tendency to be reverse-rotated when a load inertia is smaller and a voltage is larger.

In order to prevent a reverse-rotation of the synchronous rotor 300 and the induction rotor 200 of the induction motor, a reverse-rotation preventing unit has been provided at the induction motor, However, the reverse-rotation preventing unit has a complicated structure and an expensive fabrication cost.

Techniques for preventing a reverse-rotation of the motor by a mechanical method have been disclosed in the U.S. Pat. No. 4,893,038 (1989.01.09), Japanese Examined Patent Publication No. 6-25624 (1994.04.06), Japanese Examined Utility Model Publication No. 8-11037 (1996.03.29), Japanese Patent Publication No. 9-163663 (1997.06.20), and Korean Open-Laid Publication No. 1998-0003324 (1998.03.30).

However, according to the techniques for preventing a reverse-rotation of the motor by a mechanical method, an entire structure is complicated and a reliability of the motor is low.

BRIEF DESCRIPTION OF THE INVENTION

Therefore, an object of the present invention is to provide a motor having a reverse-rotation preventing unit capable of preventing a reverse rotation of a rotor at the time of an initial driving, simplifying a structure, and being easily fabricated.

To achieve these and other advantages and in accordance with the purpose of the present invention, as embodied and broadly described herein, there is provided a motor having a reverse-rotation preventing unit, comprising: a casing; a stator fixedly-coupled inside the casing; a primary rotor rotatably inserted into the stator; a motor shaft coupled to the primary rotor; a secondary rotor having a permanent magnet and rotatably inserted into an air gap between the stator and the primary rotor; a locking unit installed at an inner wall of the casing; a ratchet unit rotatably coupled to the secondary rotor, and locked or unlocked to/from the locking unit when the secondary rotor is forward-rotated or reverse-rotated, for rotating the secondary rotor in a forward direction, and a position setting unit for moving the ratchet unit to a locking position or a unlocking position by a difference between a centrifugal force generated when the secondary rotor is rotated and its restoration force.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the is description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a motor having a reverse-rotation preventing unit according to the present invention will be explained with reference to the attached drawings.

Figure 3:
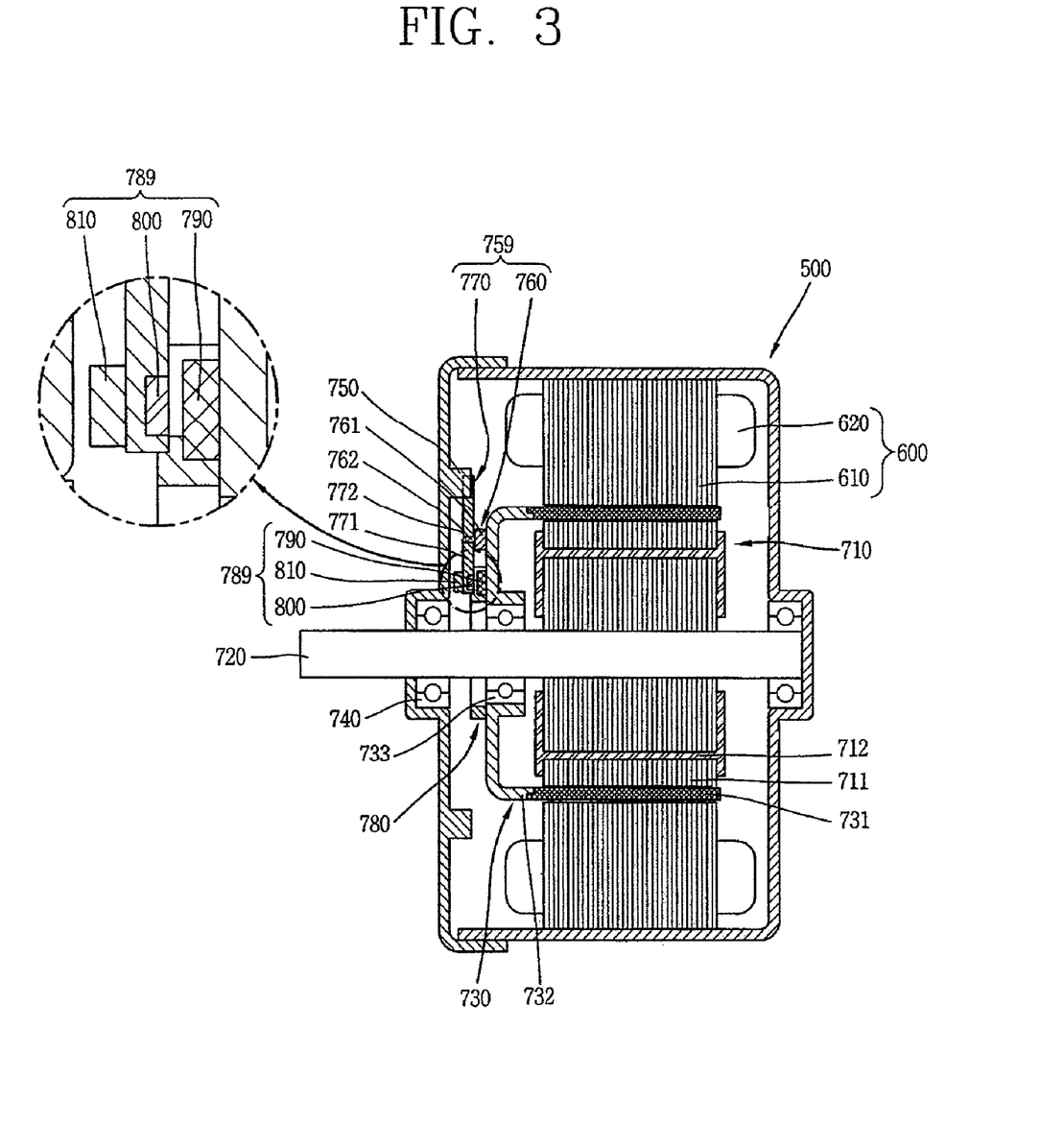
FIG. 3 is a sectional view showing a motor having a reverse-rotation preventing unit according to a first embodiment of the present invention.
Figure 4:
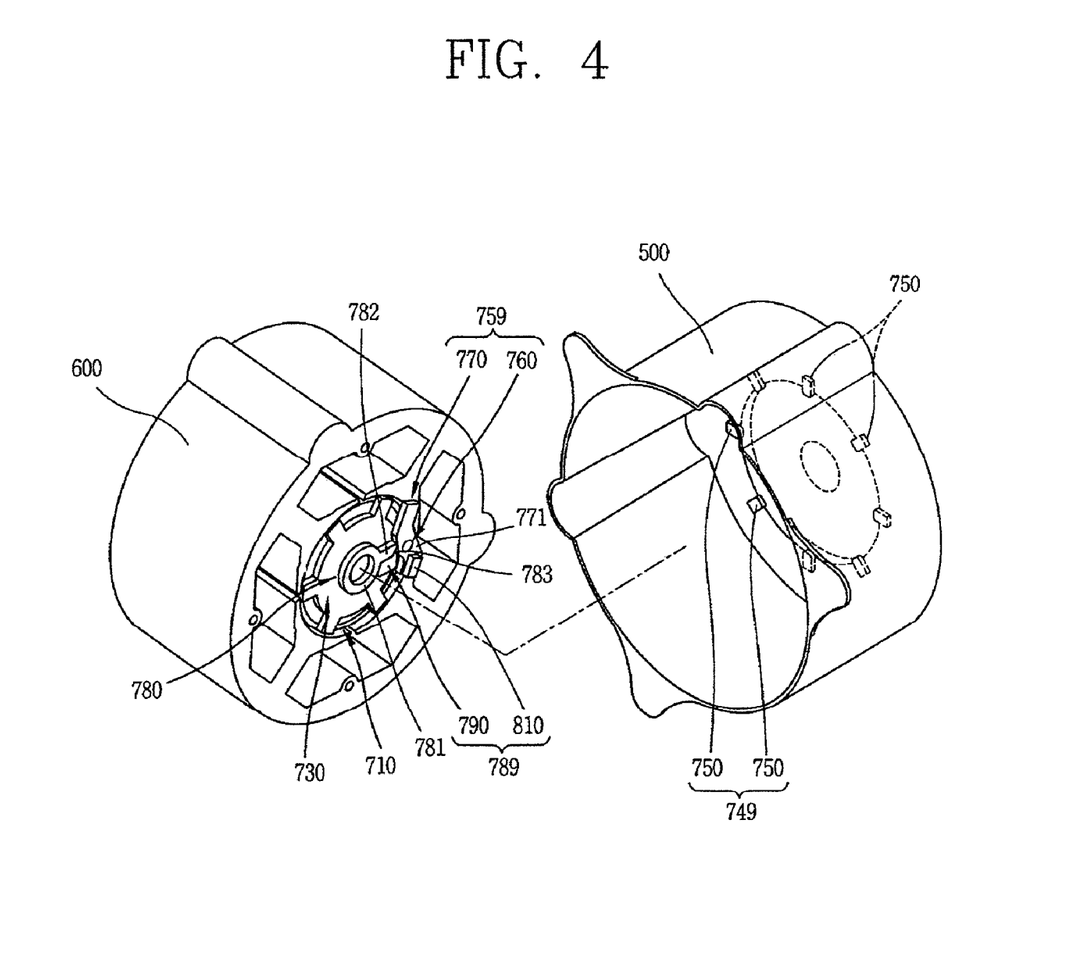
FIG. 4 is a disassembled perspective view of the motor having a reverse-rotation preventing unit according to a first embodiment of the present invention.
Figure 5:
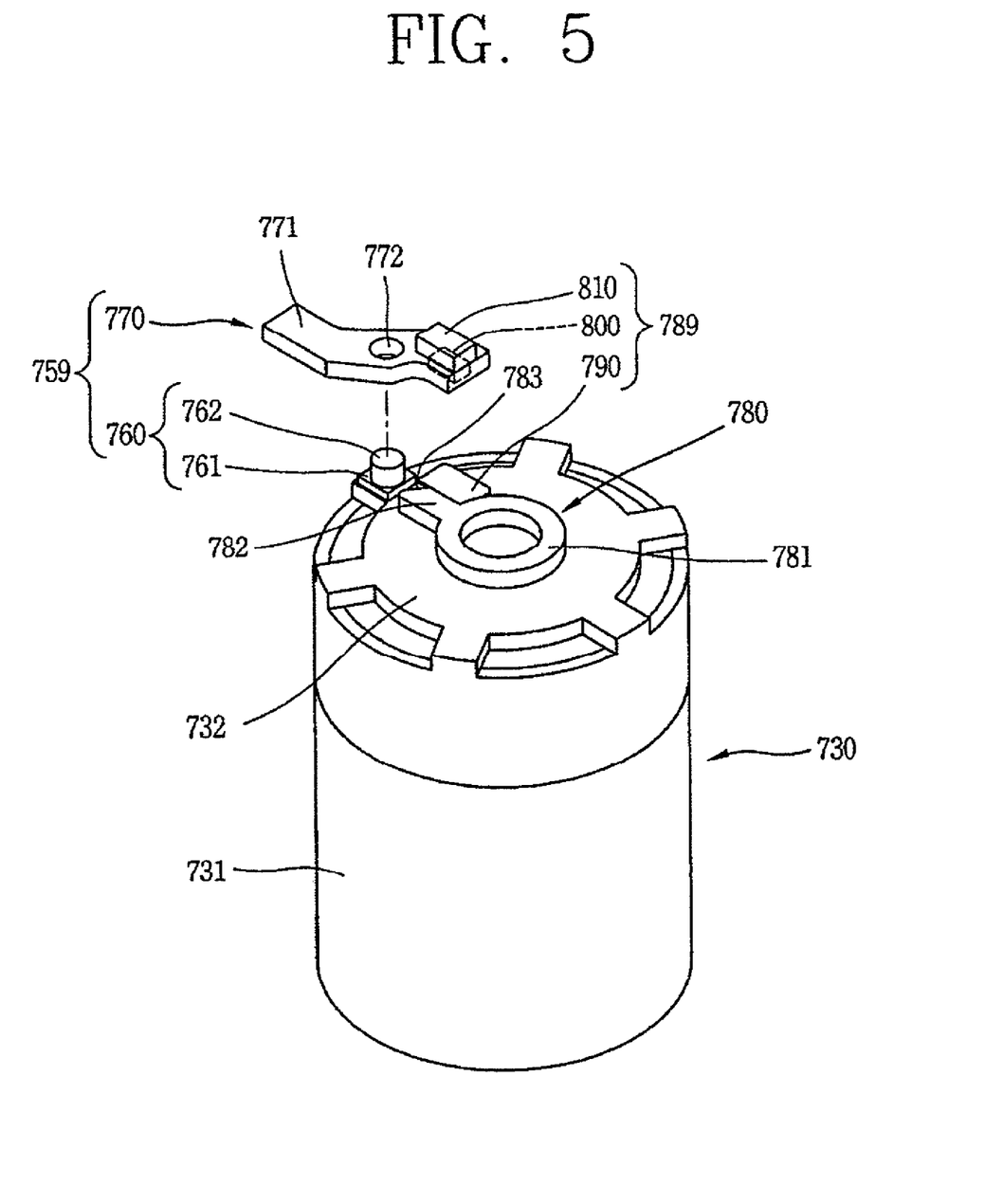
FIG. 5 is a disassembled perspective view of a ratchet unit of the motor having a reverse-rotation preventing unit according to a first embodiment of the present invention.

FIG. 3 is a sectional view showing a motor having a reverse-rotation preventing unit according to a first embodiment of the present invention, FIG. 4 is a disassembled perspective view of the motor having a reverse-rotation preventing unit according to a first embodiment of the present invention, and FIG. 5 is a disassembled perspective view of a ratchet unit of the motor having a reverse-rotation preventing unit according to a first embodiment of the present invention.

As shown, a motor having a reverse-rotation preventing unit according to the present invention comprises: a casing 500; a stator 600 fixedly-coupled to an inside of the casing 500; a primary rotor 710 rotatably inserted into the stator 600; a motor shaft 720 coupled to the primary rotor 710; a secondary rotor 730 having a permanent magnet 731 and rotatably inserted into an air gap between the stator 600 and the primary rotor 710, a locking unit 749 installed at an inner wall of the casing 500; a ratchet unit 759 rotatably coupled to the secondary rotor 730, and locked or unlocked to/from the locking unit 749 when the secondary rotor 730 is forward-rotated or reverse-rotated, for rotating the secondary rotor 730 in a forward direction; and a position setting unit 789 for moving the ratchet unit 759 to a locking position or a unlocking position by a difference between a centrifugal force generated when the secondary rotor is rotated and its restoration force.

The casing 500 is formed as a cylindrical shape having a certain length and closed both ends.

The stator 600 comprises a stator core 610 having a certain length and having a through hole therein, and winding coils 620 wound on a plurality of teeth formed at an inner circumferential surface of the stator core 610 and generating a rotating magnet field. The stator core 610 is a lamination body formed accordingly as a plurality of sheets are laminated. The stator 600 is fixedly coupled to an inner wall of the casing 500.

The winding coils 620 are composed of main coils and sub coils.

The primary rotor 710 comprises a rotor core 711 of a filled cylindrical type having a certain length and outer diameter, and an induction frame 712 provided in the rotor core 711. The rotor core 711 is a lamination body formed accordingly as a plurality of sheets are laminated, and a motor shaft 720 is inserted to a center of the rotor core 711. A load such as a fan, etc. is connected to the motor shaft 720. The induction frame 712 is formed to have a squirrel cage type.

The primary rotor 710 is inserted into the through hole of the stator 600, and a certain air gap is formed between an outer circumferential surface of the primary rotor 710 and an inner circumferential surface of the through hole of the stator 600.

A bearing 740 is fixed to one side of the motor shaft 720, and the bearing 740 is fixed to one side wall of the casing 500. One side of the motor shaft 720 is protruding outside the casing 500.

The bearings 740 are fixedly coupled to both sides of the motor shaft 720, and the two bearings 740 are fixedly coupled to both side walls of the casing 500. Both ends of the motor shaft 720 can be protruding outside the both side walls of the casing 500.

The secondary rotor 730 comprises a permanent magnet 731 of a hollow cylindrical type having a certain thickness; a holder 732 having a cup shape for supporting the permanent magnet 731; and a bearing 733 fixedly coupled to one side of the holder 732. The permanent magnet 731 is rotatably inserted into an air gap between an inner circumferential surface of the through hole of the stator 600 and an outer circumferential surface of the primary rotor 710. Also, the bearing 733 coupled to one side of the holder 732 is fixedly coupled to the motor shaft 720.

The locking unit 749 is constructed as a plurality of stationary blocks 750 protruding from one inner side wall of the casing 500. The stationary blocks 750 are arranged in a circumferential direction with a certain gap therebetween. The motor shaft 720 is penetratingly inserted into the center of the casing 500.

Preferably, the stationary blocks 750 are formed to have the same shape. However, the stationary blocks 750 can have various shapes.

The stationary blocks 750 can be integrally formed with the casing 500, or can be separately formed thus to be coupled to an inner wall of the casing 500.

The ratchet unit 759 comprises a fixing pin 760 fixedly coupled to the secondary rotor 730, and a ratchet member 770 rotatably coupled to the fixing pin 760 and locked or unlocked to/from the locking unit 749.

The fixing pin 760 includes a first pin 761 having a certain length and outer diameter; and a second pin 762 having a certain length, having an outer diameter smaller than that of the first pin 761, and extending from the first pin 761. An interface between the first pin 761 and the second pin 762 has a stepped portion. The fixing pin 760 is fixedly coupled to a lateral edge of the holder 732 of the secondary rotor 730, and the first pin 761 of the fixing pin 760 is fixedly coupled to the holder 732.

The ratchet member 770 includes a body having a certain thickness and area, and a pin hole 772 penetratingly formed in the body 771 for inserting the fixing pin 760. Preferably, the ratchet member 770 is formed of a non-magnetic material such as a hard rubber material, etc. As the first pin 761 of the fixing pin 760 is inserted into the pin hole 772 of the ratchet member 770, one surface of the is ratchet member 770 is supported by the stepped portion.

A fixing member 780 for selectively locking another side of the ratchet member 770 is fixedly coupled to the holder 732 of the secondary rotor 730. The fixing member 780 comprises a ring portion 781 having a certain thickness and width, and a protrusion portion 782 protruded from an outer circumferential surface of one side of the ring portion 781. The protrusion portion 782 is formed to have a certain width and length, and an inclined surface 783 is provided at one surface of the protrusion portion 782. The fixing member 780 is fixedly coupled to the holder 732 so that the center of the ring portion of the fixing member 780 can be consistent with the center of the holder 732.

A thickness of the protrusion portion 782 of the fixing member 780 is formed to be greater than a length of the first pin 761 of the fixing pin 760 so that one side of the ratchet member 770 can be locked by the protrusion portion 782 of the fixing member 780 when the ratchet member 770 coupled to the fixing pin 760 is rotated.

When the ratchet member 770 is rotated by an angle more than a set angle, the fixing member 780 supports one side of the ratchet member 770 thus to prevent the ratchet member 770 from being rotated by the angle more than a set angle.

The position setting unit 789 includes a parking magnet 790 mounted at the secondary rotor 730 so as to be positioned in a rotation region of the ratchet unit 759, a magnetic member 800 formed at one side of the ratchet unit 759 and having a tensile force by a magnetic force of the parking magnet 790, and a counter weight 810 mounted at one side of the ratchet unit 759 and providing a centrifugal force generated when the secondary rotor 730 is rotated to the ratchet unit 759.

The parking magnet 790 is formed to have a certain thickness and area, and is fixedly coupled to one side surface of the holder 732 of the secondary rotor 730. A thickness of the parking magnet 790 is formed to be smaller than a length of the first pin 761 of the fixing pin 760 so that the ratchet member 770 coupled to the fixing pin 760 can not be interfered with the parking magnet 790 when the ratchet member 770 is rotated.

The magnetic member 800 is fixedly coupled to one side of the ratchet member 770, and the counter weight 810 is positioned at the side of the magnetic member 800. That is, the magnetic member 800 and the counter weight 810 are positioned at one side on the basis of the pin hole 772 of the ratchet member 770. Preferably, the magnetic member 800 and the counter weight 810 are positioned on the same line.

The magnetic member 800 and the counter weight 810 can be integrally formed. That is, since the magnetic member 800 has a weight including a weight of the counter weight 810, it serves as the counter weight 810, too.

Figure 6:
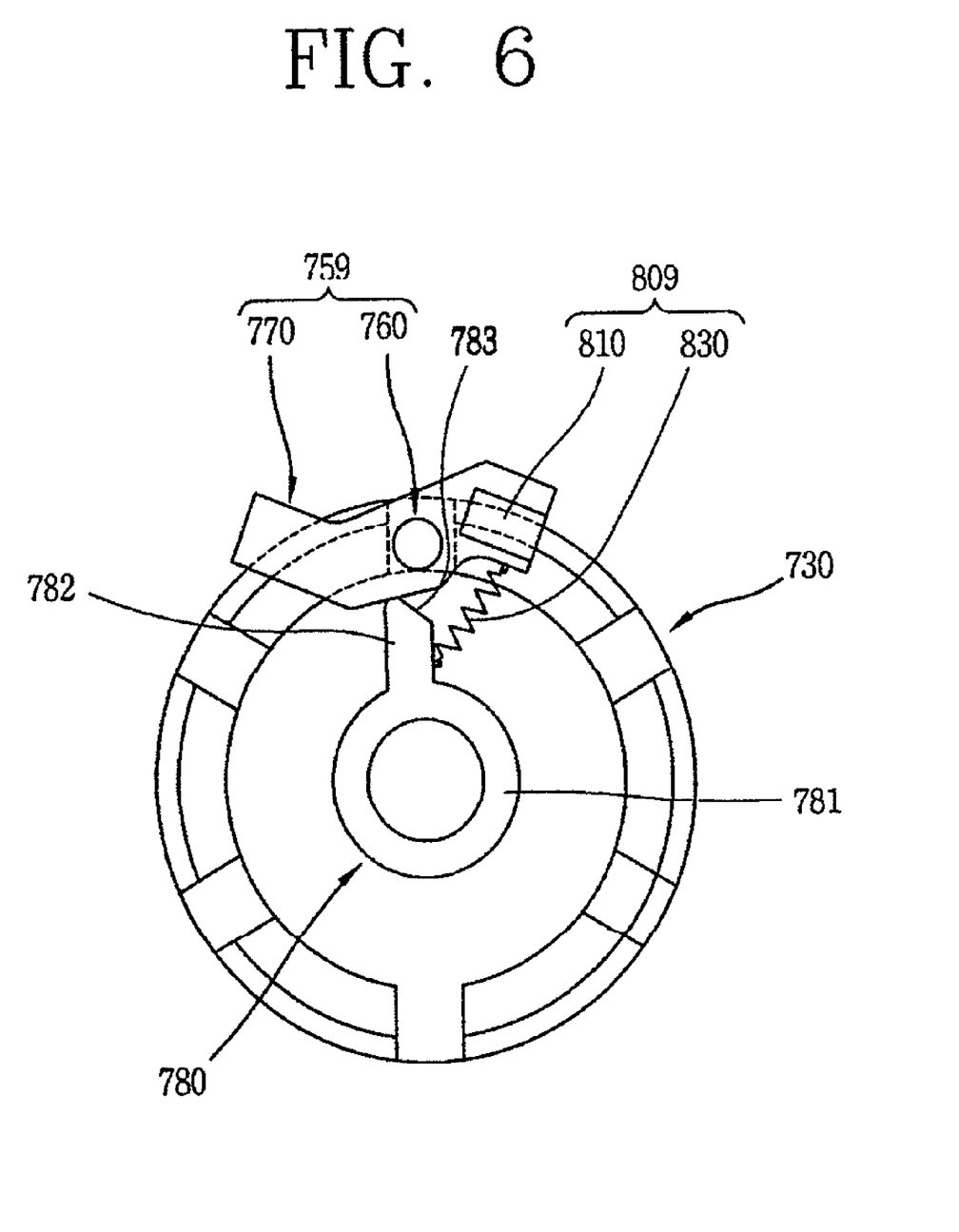
FIG. 6 is a frontal view of a position setting unit of the motor having a reverse-rotation preventing unit according to a second embodiment of the present invention.

As shown in FIG. 6, as another modification example, the position setting unit 809 comprises an elastic member 830 for connecting the secondary rotor 730 and one side of the ratchet unit 759, and a counter weight 810 mounted at one side of the ratchet unit 759 and providing a centrifugal force generated when the secondary rotor 730 is rotated to the ratchet unit 759.

The elastic member 830 is a tension coil spring having a certain length. One side of the tension coil spring is fixedly coupled to one side of the ratchet member 770 of the ratchet unit 759, and another side of the tension coil spring is fixedly coupled to one side of the fixing member 780. Accordingly, when the ratchet member 770 is rotated centering around the fixing pin 760 by an external force and one side of the ratchet member 770 is spaced from the fixing member 780, a restoration force of the tension coil spring is applied to the ratchet member 770. When the external force is removed, the ratchet member 770 is moved to the fixing member 780.

The elastic member 830 can be implemented as a rubber band, etc. besides the tension coil spring.

Figure 7:
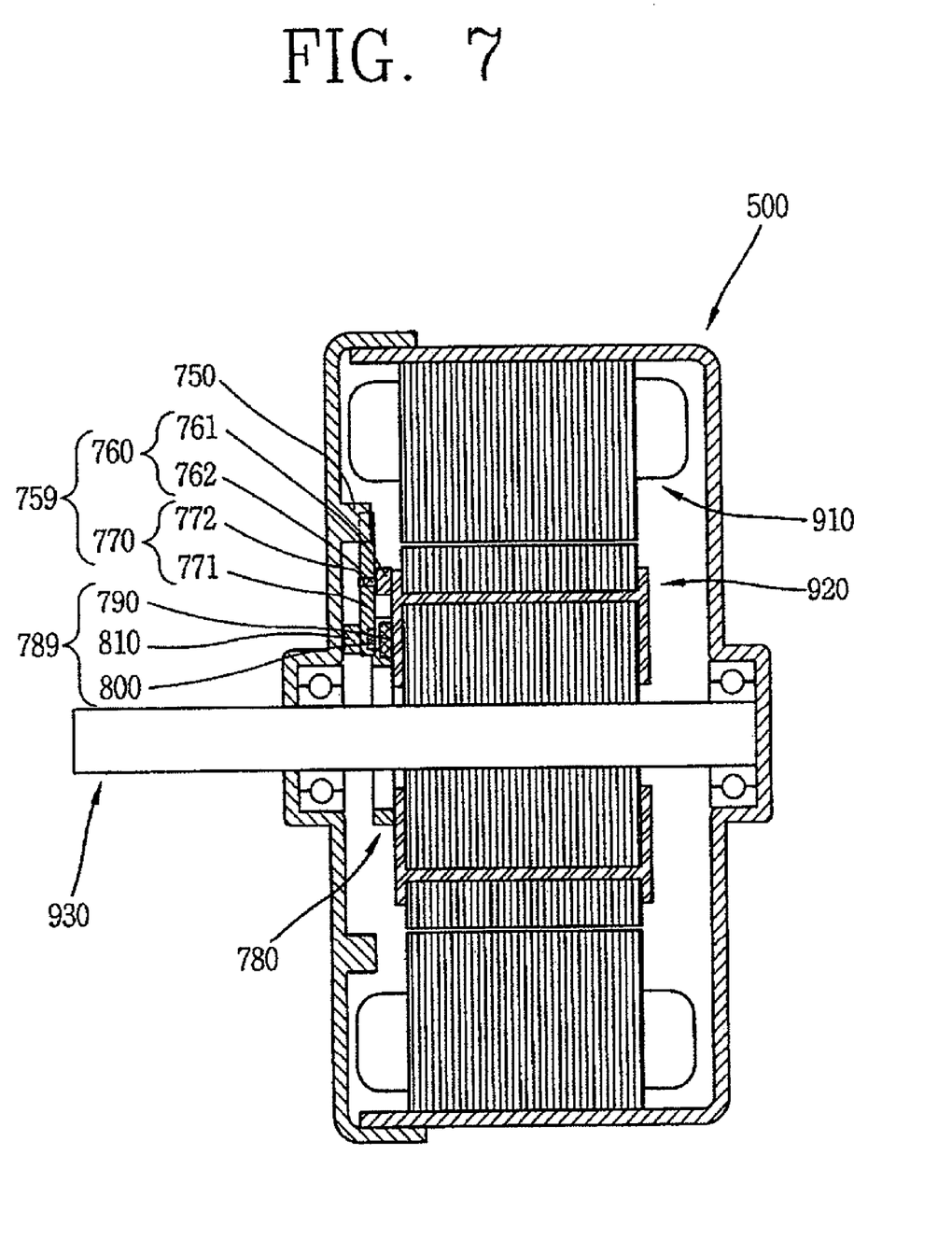
FIG. 7 is a sectional view showing a motor having a reverse-rotation preventing unit according to a second embodiment of the present invention.

As shown in FIG. 7, a motor having a reverse-rotation preventing unit according to a second embodiment of the present invention can be applied to an induction motor excluding the secondary rotor 730 of the first embodiment. That is, a locking unit 749 is provided at the casing 500 of the induction motor, and a ratchet unit 759 locked or unlocked to/from the locking unit 749 when the rotor 920 is forward-rotated or reverse-rotated for rotating the rotor 920 in a forward direction is provided at the rotor 920. A position setting unit 789 for moving the ratchet unit 759 to a locking position or a unlocking position by a difference between a centrifugal force generated when the rotor 920 is rotated and its restoration force is provided at the ratchet unit 759 and the rotor 920. The locking unit 749, the ratchet unit 759, and the position setting unit 789 according to the second embodiment have the same construction as those according to the first embodiment.

An unexplained reference numeral 910 denotes a stator, and 930 denotes a motor shaft.

Hereinafter, an effect of the motor having a reverse-rotation preventing unit according to the first embodiment of the present invention will be explained.

When a current is sequentially applied to the winding coils 620 of the stator 600 and thus a rotating magnet field is generated, the second rotor 730 is synchronized by the rotating magnet field thus to be rotated with a synchronous speed. As the secondary rotor 730 is rotated, a flux is formed by the permanent magnet 731 of the secondary rotor 730 and an induction current is applied to the primary rotor 710 by the flux. The primary rotor 710 is rotated by the rotating magnet field generated by the winding coils 620 of the stator 600, the permanent magnet 710 of the secondary rotor 730, the induction current applied to the primary rotor 710, etc.

As the primary rotor 710 is rotated, the motor shaft 720 coupled to the primary rotor 710 is rotated thereby to transmit a rotation force to a load coupled to the motor shaft 720.

A reverse rotation force is generated at the secondary rotor 730 by an abnormal phase of a voltage applied to the motor for an initial driving or an uneven rotating magnet field, and thus the secondary rotor 730 is reverse-rotated. At the same time, a reverse-rotation force is applied to the primary rotor 710 by an induction current applied to the primary rotor 710, and thus the primary rotor 710 is reverse-rotated.

Figure 8:
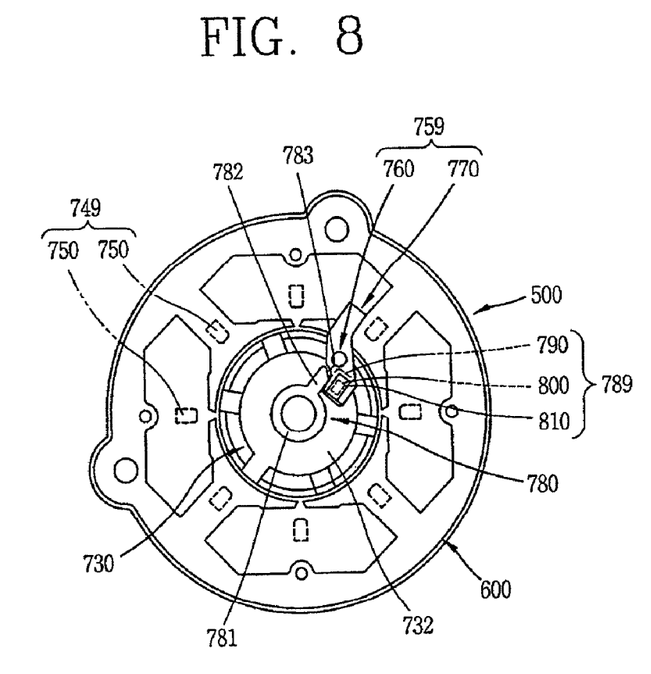
FIGS. 8 to 12 are frontal views showing an operation state of the motor having a reverse-rotation preventing unit according to a first embodiment of the present invention.
Figure 9:
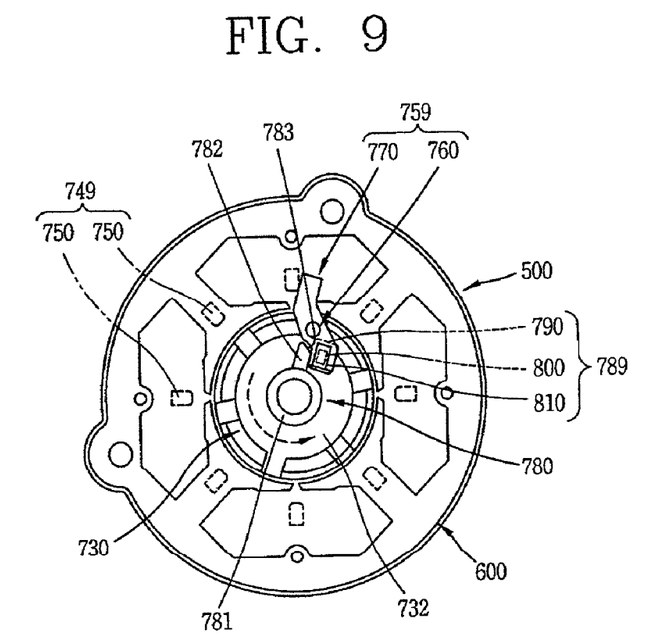

However, when a reverse-rotation force is generated at the secondary rotor 730 and the secondary rotor 730 is reverse-rotated by the reverse-rotation force, as shown in FIGS. 8 and 9, the secondary rotor 730 is reverse-rotated at an arbitrary position. Then, the ratchet member 770 of the ratchet unit 759 mounted at the secondary rotor 730 is locked by the stationary blocks 750 of the locking unit 749 provided at the casing 500, thereby preventing the reverse-rotation of the secondary rotor 730. Herein, the magnetic member 800 provided at one side of the ratchet member 770 is positioned at the side of the parking magnet 790 by a magnetic force of the parking magnet 790 fixedly coupled to the secondary rotor 730, so that the ratchet member 770 is positioned in a center direction of the secondary rotor 730. As the result, the secondary rotor 730 is reverse-rotated, one side of the ratchet member 770 mounted at the secondary rotor 730 is locked by the stationary blocks 750, and another side of the ratchet member 770 is locked by the protrusion portion 782 of the fixing member 780, thereby preventing the secondary rotor 730 from being reverse-rotated. The narrower the gap between the stationary blocks 750 is, the less the impact between the ratchet unit 759 and the stationary blocks 750 and collision noise are.

Figure 10:
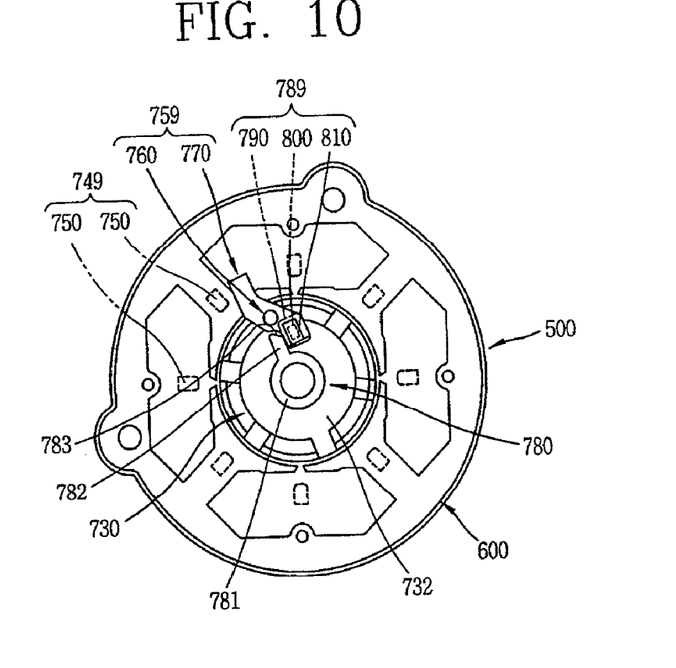
Figure 11:
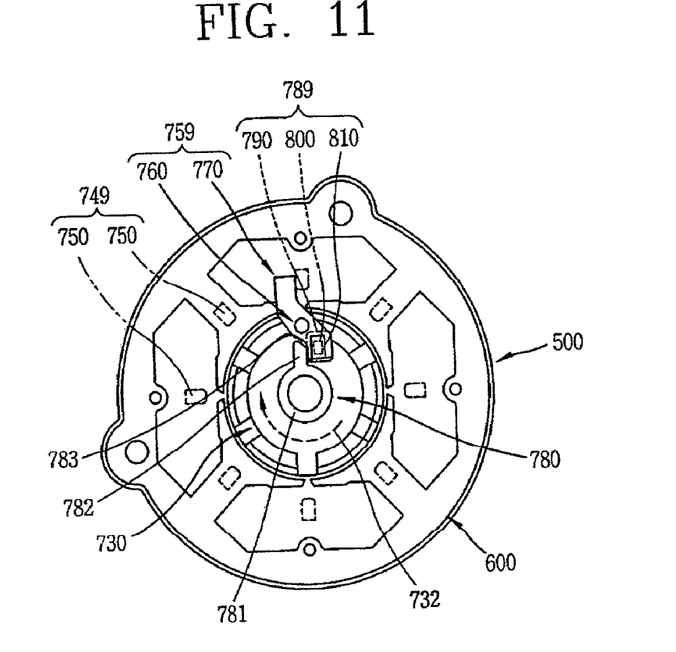
Figure 12:
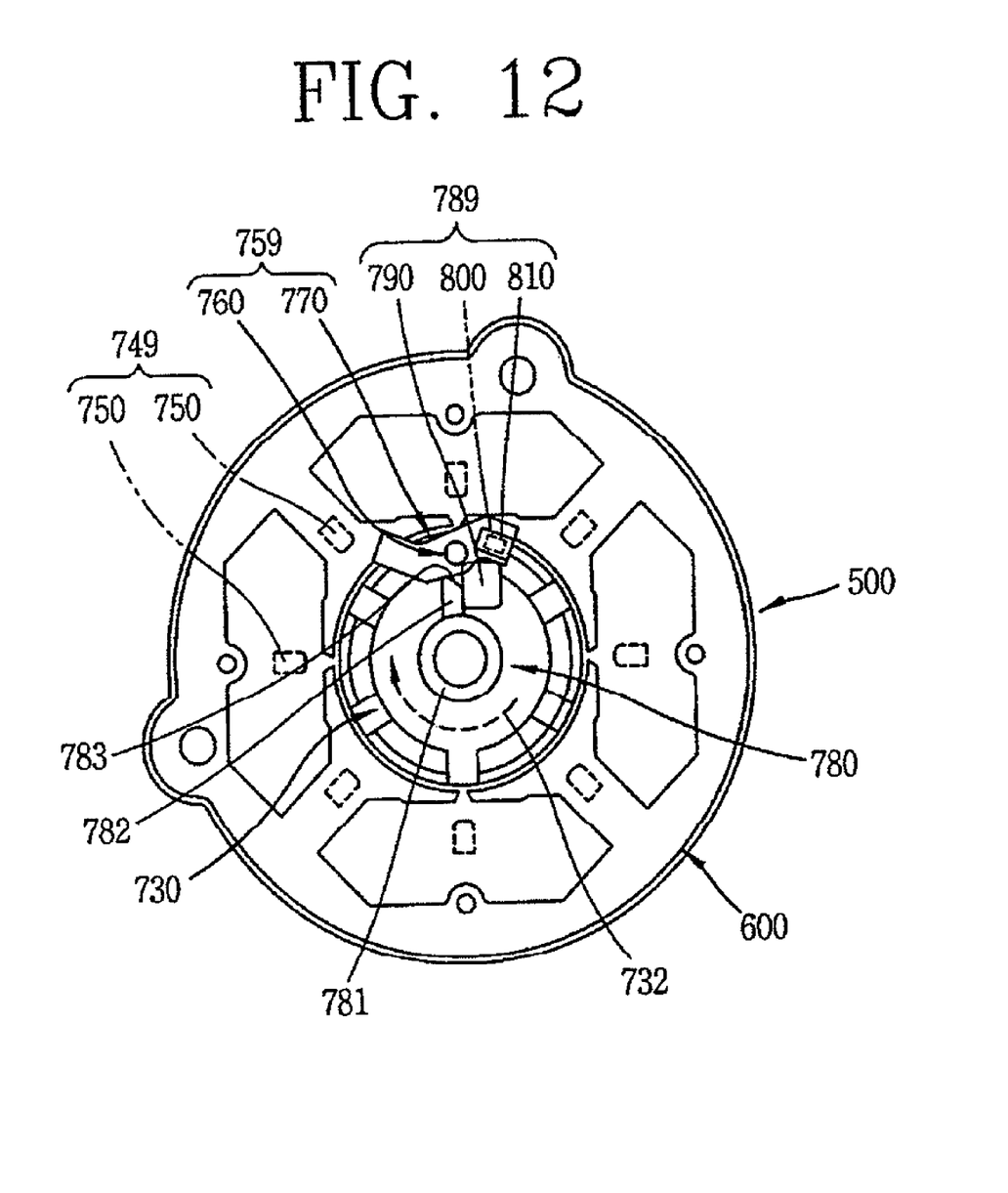

When an abnormal phase of a voltage applied to the motor for an initial driving is changed or an uneven rotating magnet field is removed, a forward rotation force is applied to the secondary rotor 730 and the secondary rotor 730 is forward-rotated by the forward rotation force. As shown in FIGS. 10, 11, and 12, when the secondary rotor 730 is forward-rotated, the ratchet member 770 rotated together with the secondary rotor 730 collides with the stationary blocks 750 and thus the ratchet member 770 is rotated centering around the fixing pin 760. As the result, the ratchet member 770 is deviated from the stationary blocks 750 of the casing 500.

When the secondary rotor 730 is rotated under a state that the ratchet member 770 is deviated from the stationary blocks 750 of the casing 500, the primary rotor 710 is forward-rotated by a flux of the permanent magnet 731 of the secondary rotor 730. As the secondary rotor 730 is rotated, a centrifugal force is applied to the counter weight 810 provided at the ratchet member 770 mounted at the secondary rotor 730 and thus the ratchet member 770 is positioned outside the stationary blocks 750 of the casing 500.

When the motor is stopped, the rotation of the secondary rotor 730 is stopped and the magnetic member 800 provided at one side of the ratchet member 770 is positioned at the side of the parking magnet 790 by a magnetic force of the parking magnet 790 fixedly coupled to the secondary rotor 730. Therefore, as shown in FIG. 8 or 10, the ratchet member 770 is positioned in a center direction of the secondary rotor 730.

When the position setting unit 809 includes the elastic member 830 and the counter weight 810, a position of the ratchet member 770 is determined by a difference between an elastic force of the elastic member 830 and a centrifugal force of the counter weight 810 due to a rotation force of the secondary force 730.

An operation of the motor having a reverse-rotation preventing unit according to the second embodiment of the present invention is the same as that according to the first embodiment, and thus its minute explanation will be omitted.

In the motor having a reverse-rotation preventing unit according to the present invention, when a reverse-rotation force is applied to the secondary rotor 730 by an abnormal phase of a voltage applied to the motor for an initial driving or an uneven rotating magnet field, the secondary rotor 730 is locked by the ratchet unit 759 thereby to prevent the secondary rotor 730 and the primary rotor 710 from being reverse-rotated.

Also, when a reverse-rotation force is applied to the secondary rotor 730 by an abnormal phase of a voltage applied to the motor for an initial driving or an uneven rotating magnet field, the secondary rotor is prevented from being reverse-rotated by the ratchet unit 759, the position setting unit 789, etc. thereby to simplify the components and the structure.

As aforementioned, in the motor having a reverse-rotation preventing unit according to the present invention, the motor is only forward-rotated without being reverse-rotated, thereby enhancing the reliability of the motor. Furthermore, since the number of the components is less and the entire structure is simplified, the fabrication process is facilitated and the fabrication cost is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A motor having a reverse-rotation preventing unit, comprising:
   a casing;
   a stator fixedly-coupled to an inside of the casing;
   a primary rotor rotatably inserted into the stator;
   a motor shaft coupled to the primary rotor;
   a secondary rotor having a permanent magnet and rotatably inserted into an air gap between the stator and the primary rotor;
   a locking unit installed at an inner wall of the casing;
   a ratchet unit rotatably coupled to the secondary rotor, and locked or unlocked to/from the locking unit when the secondary rotor is forward-rotated or reverse-rotated, for rotating the secondary rotor in a forward direction; and
   a position setting unit that moves the ratchet unit using a restoration force to a locked position when the secondary rotor is stationary, and moves the ratchet unit to an unlocked position when the secondary rotor is rotating using a centrifugal force generated by the rotation of the secondary rotor.

2. The motor of claim 1, wherein the locking unit is constructed as a plurality of stationary blocks arranged at an inner wall of the casing with a certain gap therebetween in a circumferential direction.

3. The motor of claim 2, wherein the stationary blocks are integrally formed with the casing.

4. The motor of claim 1, wherein the ratchet unit comprises:
   a fixing pin fixedly coupled to the secondary rotor; and
   a ratchet member rotatably coupled to the fixing pin and locked or unlocked to/from the locking unit.

5. The motor of claim 1, wherein the ratchet unit is positioned at an edge of the secondary rotor.

6. The motor of claim 4, wherein the ratchet member is formed of a hard rubber material.

7. The motor of claim 4, wherein the fixing pin has a stepped portion for setting a coupling position of the ratchet member.

8. The motor of claim 1, wherein a fixing member for selectively locking another side of the ratchet member is provided at one side of the secondary rotor.

9. The motor of claim 1, wherein the position setting unit comprises:
   a parking magnet mounted at the secondary rotor so as to be positioned in a rotation region of the ratchet unit;
   a magnetic member formed at one side of the ratchet unit and having a tensile force by a magnetic force of the parking magnet; and
   a counter weight mounted at one side of the ratchet unit and providing a centrifugal force generated when the secondary rotor is rotated to the ratchet unit.

10. The motor of claim 9, wherein the magnetic member and the counter weight are integrally formed with each other.

11. The motor of claim 9, wherein the magnetic member and the counter weight are positioned on the same line.

12. The motor of claim 1, wherein the position setting unit comprises:
- an elastic member for connecting the secondary rotor and one side of the ratchet unit; and
- a counter weight mounted at one side of the ratchet unit and providing a centrifugal force generated when the secondary rotor is rotated to the ratchet unit.

13. The motor of claim 1, wherein the secondary rotor comprises:
- a permanent magnet having a hollow cylindrical type of a certain thickness, and having a plurality of polarities in a circumferential direction;
- a holder for supporting the permanent magnet; and
- a bearing coupled to the holder and the motor shaft.

\* \* \* \* \*